United States Patent
Lee et al.

(10) Patent No.: US 10,972,203 B2
(45) Date of Patent: Apr. 6, 2021

(54) DETECTING AND RESPONDING TO RENDERING OF INTERACTIVE VIDEO CONTENT

(71) Applicant: Gracenote, Inc., Emeryville, CA (US)

(72) Inventors: Dewey Ho Lee, Berkeley, CA (US); Shashank C. Merchant, Sunnyvale, CA (US); Markus K. Cremer, Orinda, CA (US)

(73) Assignee: Gracenote, Inc., Emeryville, CA (US)

(*) Notice: Subject to any disclaimer, the term of this patent is extended or adjusted under 35 U.S.C. 154(b) by 259 days.

(21) Appl. No.: 15/620,440

(22) Filed: Jun. 12, 2017

(65) Prior Publication Data
US 2018/0359040 A1    Dec. 13, 2018

(51) Int. Cl.
*H04H 60/37* (2008.01)
*H04N 21/41* (2011.01)
(Continued)

(52) U.S. Cl.
CPC ........... *H04H 60/372* (2013.01); *A63F 13/00* (2013.01); *A63F 13/75* (2014.09); *G06F 16/783* (2019.01);
(Continued)

(58) Field of Classification Search
CPC ....... H04N 21/23418; H04N 21/44008; H04N 21/232; H04N 21/235; H04N 21/25866;
(Continued)

(56) References Cited

U.S. PATENT DOCUMENTS 6,053,814 A    4/2000 Pchenitchnikov et al.
7,682,237 B2   3/2010 Ueshima et al.
(Continued)

FOREIGN PATENT DOCUMENTS

EP    2067508    6/2009
GB    2425909    11/2006
(Continued)

OTHER PUBLICATIONS

International Search Report and Written Opinion from International Application No. PCT/US2018/032202, dated Nov. 12, 2018.
(Continued)

*Primary Examiner* — Pankaj Kumar
*Assistant Examiner* — Franklin S Andramuno
(74) *Attorney, Agent, or Firm* — McDonnell Boehnen Hulbert & Berghoff LLP

(57) ABSTRACT

A computing system obtains a fingerprint of video content being rendered by a video presentation device, including a first portion representing a pre-established video segment and a second portion representing a dynamically-defined video segment. While obtaining the query fingerprint, the computing system (a) detects a match between the first portion of the query fingerprint and a reference fingerprint that represents the pre-established video segment, (b) based on the detecting of the match, identifies the video content being rendered, (c) after identifying the video content being rendered, applies a trained neural network to at least the second portion of the query fingerprint, and (d) detects, based on the applying of the neural network, that rendering of the identified video content continues. And responsive to at least the detecting that rendering of the identified video content continues, the computing system then takes associated action.

20 Claims, 7 Drawing Sheets

(51) Int. Cl.
| | | |
|---|---|---|
| *H04N 21/81* | (2011.01) | |
| *H04N 21/235* | (2011.01) | |
| *G06F 16/783* | (2019.01) | |
| *H04N 21/478* | (2011.01) | |
| *A63F 13/00* | (2014.01) | |
| *A63F 13/75* | (2014.01) | |
| *H04N 21/8352* | (2011.01) | |
| *H04N 21/658* | (2011.01) | |
| *H04N 21/258* | (2011.01) | |
| *H04N 21/44* | (2011.01) | |

(52) U.S. Cl.
CPC ..... *H04N 21/235* (2013.01); *H04N 21/25866* (2013.01); *H04N 21/4104* (2013.01); *H04N 21/44* (2013.01); *H04N 21/4781* (2013.01); *H04N 21/6581* (2013.01); *H04N 21/6582* (2013.01); *H04N 21/812* (2013.01); *H04N 21/8133* (2013.01); *H04N 21/8352* (2013.01)

(58) Field of Classification Search
CPC ............... H04N 21/4104; H04N 21/44; H04N 21/4781; H04N 21/6581; H04N 21/6582; H04N 21/812; H04N 21/8133; H04N 21/8352; H04H 60/372; A63F 13/75; A63F 13/00; G06F 16/783
USPC .................................................. 725/93, 120
See application file for complete search history.

(56) References Cited

U.S. PATENT DOCUMENTS

| | | | |
|---|---|---|---|
| 7,976,385 B2 | 7/2011 | Riggs et al. | |
| 8,616,973 B2 | 12/2013 | Osman | |
| 8,979,658 B1 | 3/2015 | Kulavik | |
| 9,372,531 B2 | 6/2016 | Benson et al. | |
| 9,872,076 B1* | 1/2018 | Lewis | H04N 21/4788 |
| 2002/0161462 A1 | 10/2002 | Fay et al. | |
| 2002/0161586 A1 | 10/2002 | Wang | |
| 2004/0162759 A1 | 8/2004 | Willis | |
| 2006/0106867 A1* | 5/2006 | Burges | G06F 17/30026 |
| 2006/0233389 A1 | 10/2006 | Mao et al. | |
| 2006/0252533 A1* | 11/2006 | Sakaguchi | A63F 13/10 463/31 |
| 2007/0072676 A1 | 3/2007 | Baluja | |
| 2007/0155494 A1 | 7/2007 | Wells et al. | |
| 2008/0004115 A1 | 1/2008 | Chatani | |
| 2008/0009332 A1 | 1/2008 | Kake | |
| 2008/0318676 A1* | 12/2008 | Ham | A63F 13/10 463/35 |
| 2009/0150947 A1* | 6/2009 | Soderstrom | G06F 17/30817 725/93 |
| 2009/0176569 A1 | 7/2009 | Eves et al. | |
| 2010/0027837 A1 | 2/2010 | Levy et al. | |
| 2012/0014553 A1 | 1/2012 | Bonanno | |
| 2012/0108320 A1 | 5/2012 | Ye et al. | |
| 2013/0041648 A1 | 2/2013 | Osman | |
| 2014/0004934 A1 | 1/2014 | Peterson et al. | |
| 2014/0024451 A1 | 1/2014 | Colaco et al. | |
| 2014/0236988 A1 | 8/2014 | Harron et al. | |
| 2014/0274353 A1 | 9/2014 | Benson et al. | |
| 2014/0373043 A1* | 12/2014 | Rose | H04N 21/81 725/32 |
| 2015/0110340 A1 | 4/2015 | Harron et al. | |
| 2016/0094877 A1 | 3/2016 | Heffernan et al. | |
| 2016/0148055 A1 | 5/2016 | Zilberstein et al. | |
| 2016/0309230 A1 | 10/2016 | Li | |
| 2018/0005047 A1 | 1/2018 | Yu et al. | |
| 2018/0041765 A1 | 2/2018 | Hua et al. | |

FOREIGN PATENT DOCUMENTS

| | | |
|---|---|---|
| KR | 20160119432 | 10/2016 |
| WO | WO2009/026564 | 2/2009 |
| WO | WO2017/058951 | 4/2017 |

OTHER PUBLICATIONS

Office Action from U.S. Appl. No. 16/015,771, dated Nov. 21, 2018.
Office Action from U.S. Appl. No. 16/015,771, dated May 6, 2019.
Office Action from U.S. Appl. No. 16/015,771, dated May 18, 2020.
Office Action from U.S. Appl. No. 16/015,771, dated Nov. 4, 2019.

* cited by examiner

DETECTING AND RESPONDING TO RENDERING OF INTERACTIVE VIDEO CONTENT

BACKGROUND

A typical video presentation device operates to receive a digital video stream representing video content and to render the video content on a display for viewing by one or more users. Examples of such devices include, without limitation, televisions, computer monitors, head-mounted displays, tablets, smart phones, watches, cameras, projection systems, and the like.

In many cases, the video presentation device may be in communication with a video source that could selectively provide any of a variety of video content for rendering, and the video presentation device could be arranged to receive and render the selected video content. For example, the video presentation device could be coupled or communicatively linked with a receiver, player, console, computer, and/or remote server that is configured to output video content selected by a user, and the video presentation device could be configured to receive the video content being output by the video source and to render the video content on a display in real-time for viewing.

Some video content could be at least partially "interactive," where a user to whom the video content is presented interacts with the content as it is being rendered, and the content varies dynamically based on that user-interaction. Without limitation, an example of interactive video content is video game, where a user (a person who plays the game) has at least some control over how the game proceeds and thus what the video content of the game would be over time. For instance, through interaction with a game console, remote server, or other source of the game's video content, a user might control video content associated with achieving or failing to achieve a goal of the game, gaining or losing an item in the game, virtual orientation within the game, and/or movement or other actions of one or more avatars or objects in the game, among numerous other possibilities. As a result, the interactive video content could vary in real-time based on the user's input and could differ, possibly substantially, each time it is played.

Such user interaction and impact on the video content being rendered can be distinguished from user control over the basic mechanics of playing the video content, where the user's interaction has no impact on the underlying video content itself. For example, a video source such as a game console or remote server might allow a user to control functions such as play, pause, stop, fast-forward, or fast-reverse. But those control functions would not impact the underlying video content and would thus not be considered interactive, in contrast to real-time user interaction controlling the story and progression of a video game for instance.

Further, video content that includes such interactive or dynamically-defined content may also include from time to time certain pre-established or statically-defined video segments that do not vary based on user interaction while being rendered. For example, video games often include pre-established "cutscenes," such as cinematically produced video clips, that are automatically played as transitions between game levels, and other pre-established video segments such as startup scenes, shutdown scenes, and the like. Although a user may have some control over when these pre-established video segments are played, such as when the user successfully completes a level of play in a video game, content of the pre-established video segments would not vary based on user interaction while the pre-established video segments are being rendered.

SUMMARY

When a video presentation device receives and renders video content, the video presentation device may not have an indication of the identity of the video content being rendered. A video source such as a local player or remote server that provides the video content to the video presentation device may have such information. But the video presentation device that receives the video content from that video source may have no such information.

For instance, if a computer monitor is connected with a video game console and a user interacts with the game console to select a particular video game to play, the game console may have an indication of which game is being played and therefore which game's video content is being output for rendering. But the computer monitor may merely receive and render the video content provided by the game console and may have no indication that the video content being rendered is a video game, let alone which video game is being played and therefore which video game's content the computer monitor is rendering.

For various reasons, however, it may be useful to determine the identity of video content being rendered by a video presentation device. Further, it may be useful to do so without receiving from a video source a report of which video content is being presented, and perhaps without any involvement of the video source or its provider. For instance, it may be useful for the video presentation device itself, and/or a network server working in cooperation with the video presentation device, to identify the video content that the video presentation device is rendering, based on an evaluation of the video content itself as it is being rendered.

Given knowledge of the identity of the video content that is being rendered, the video presentation device or other entity could programmatically carry out one or more useful actions, such as actions specific to the identified video content. For instance, the entity could record the fact that the video presentation device is presenting the identified video content, as part of a content ratings or analytics system to measure the extent to which particular video content is presented. Alternatively, the entity could respond to particular video content being presented by triggering presentation of supplemental video content, such as a pop-up advertisements or other information related to the identified content or otherwise based on the video content being the identified video content.

By way of example, upon determining that the video content being rendered is a particular video game, an entity could present a pop-up advertisement offering virtual or physical merchandise or services related to that video game. Further, the entity could determine how long the rendering of the game continues between cutscenes and, based on that duration, could trigger presentation of supplemental content. For instance, if the duration is threshold long, the entity could trigger presentation of game play help, such as hints or other tips for achieving goals in the game, on grounds that the user appears to be struggling. Other examples are possible as well.

To facilitate this in practice, as the video presentation device is rendering video content, the video presentation device could generate and provide to a computing system a digital fingerprint of the video content being rendered. And as the computing system obtains that fingerprint, the computing system could compare that fingerprint with reference fingerprint data established in advance for known video content items. In theory, if the computing system thereby determines that the fingerprint of the video content being rendered matches the reference fingerprint of a known video content item, the server could thereby conclude that the video content being rendered by the video presentation device is that known video content item, and the computing system could responsively take action as noted above.

Unfortunately, however, this process could be problematic for interactive video content such as a video game. As explained above, interactive video content could vary dynamically based on user interaction and could therefore differ each time it is rendered. As a result, it could be impractical to establish reference fingerprint data that would serve as a reliable point of comparison for identifying the interactive video content being rendered at any given time.

On the other hand, as noted above, interactive video content such as a video game may also contain some pre-established or statically-defined video segments, such as cutscenes or the like, and those pre-established video segments would not vary dynamically based on user interaction while they are being rendered. Further, the pre-established video segments in a given video content item, such as a given video game, may be unique to that video content item (e.g., not contained in other video content items). When addressing interactive video content, it could therefore be useful to focus the fingerprint comparison on such pre-established video segments.

For instance, as the computing system obtains a digital fingerprint of the video content being rendered by the video presentation device, the computing system could compare that fingerprint with reference fingerprints of various pre-established video segments corresponding respectively with particular video content items (such as particular video games). Upon determining that the fingerprint of the video content being rendered by the video presentation device matches the reference fingerprint of a specific pre-established video segment, the computing system could thereby conclude that video content being rendered by the video presentation device is the video content item that the reference data correlates with that specific pre-established video segment.

Once the computing system thereby determines the identity of the video content being rendered by the video presentation device, at issue may then be whether, after the pre-established video segment ends, the video presentation device continues to render the identified video content. For instance, with a video game, at issue may be whether the video content being rendered after an identified cutscene ends continues to be the video game associated with that cutscene. Further, at issue could be how long the rendering of that identified video content continues between instances of pre-established video segments, such as how long interactive play of an identified video game continues between cutscenes or the like.

Here again, however, difficulty could arise due to the interactive nature of the video content. Namely, once a pre-established video segment ends and the video content transitions to be interactive content that dynamically varies based on user interaction during the rendering, it could once again be difficult to or impractical to use mere fingerprint matching as a basis to determine whether the video content being rendered continues to be the identified video content.

To help address this difficulty, in accordance with the present disclosure, the computing system could make use of a neural network or other machine-learning algorithm that is trained based on many instances of playout of the interactive video content at issue. Considering a video game, for instance, a neural network could be trained based on digital fingerprints of many instances of actual game play, such as digital fingerprints of numerous online play-though videos or the like. Although the interactive video content of a given game may differ each time the game is played, there may be sufficient similarity between instances of the game that a neural network could be trained to recognize the game and to classify or distinguish between the game and other games and/or at least between the game and non-game video content.

Thus, as a computing system obtains a digital fingerprint representing the video content being rendered by the video presentation device, the computing system could apply a fingerprint matching process as described above and could thereby identify the video content based on a fingerprint match as to a pre-established video segment associated with known video content. And as the computing system continues to obtain the digital fingerprint of the video content being rendered by the video presentation device, the computing system could then apply a neural network as to at least a dynamically-defined portion of the video content and could thereby detect that the video content being rendered by the video presentation device continues to be the identified video content. Advantageously, the computing system could then responsively take action such as that as noted above.

Accordingly, in one respect, disclosed herein is a method of detecting and responding to rendering of video content by a video presentation device, where the video content includes (i) a pre-established video segment that does not vary based on user-interaction during the rendering and (ii) a dynamically-defined video segment that varies based on user-interaction during the rendering.

In accordance with the method, a computing system obtains a query fingerprint generated in real-time during the rendering as a representation of the video content being rendered, with the query fingerprint including a first portion representing the pre-established video segment and a second portion representing the dynamically-defined video segment. Further, while obtaining the query fingerprint, the computing system (a) detects a match between the first portion of the query fingerprint and a reference fingerprint that represents the pre-established video segment, (b) based on the detecting of the match, identifies the video content being rendered, (c) after identifying the video content being rendered, applies a trained neural network to at least the second portion of the query fingerprint, and (d) detects, based on the applying of the neural network, that rendering of the identified video content continues. And still further, responsive to at least the detecting that rendering of the identified video content continues, the computing system then takes action associated with the identified video content.

In addition, in another respect, disclosed is a method of detecting and responding to playing of a video game, where the video game is rendered in real-time on a video display unit, and wherein the video game includes (i) cutscene video segments that do not vary based on user-interaction during the rendering and (ii) interactive video segments that vary based on user-interaction during the rendering.

In accordance with this method, a computing system obtains a query fingerprint generated in real-time during the rendering as a representation of the video game being played, with the query fingerprint including (i) a first portion representing a first cutscene video segment and (ii) a second portion representing a first interactive video segment. Further, the computing system detects a match between the first portion of the query fingerprint and a reference fingerprint that represents the first cutscene video segment and, based on the detected match, identifies by the computing system the video game being rendered. And after identifying the video content being rendered, the computing system applies a trained neural network to at least the second portion of the query fingerprint to detect that the video content being rendered continues to be the identified game. And still further, responsive to at least detecting that the video content being rendered continues to be the identified video game, the computing system causes supplemental content to be presented.

Yet additionally, disclosed is a computing system including a network communication interface, a processing unit, non-transitory data storage, and program instructions stored in the non-transitory data storage and executable by the processing unit to carry out operations for detecting and responding to rendering of video content by a video presentation device, where the video content includes, in order, (i) a pre-established video segment that does not vary based on user-interaction during the rendering and (ii) a dynamically-defined video segment that varies based on user-interaction during the rendering.

The operations carried out by the computing system could be similar to those noted above. For example, the operations could include receiving from a video presentation device, via the network communication interface, a query fingerprint generated in real-time during the rendering as a representation of the video content being rendered, where the query fingerprint includes, in order, (i) a first portion representing the pre-established video segment and (ii) a second portion representing the dynamically-defined video segment. Further, the operations could include detecting a match between the first portion of the query fingerprint and a reference fingerprint that represents the pre-established video segment and, based on the detected match, identifying the video content being rendered. And the operations could include, after identifying the video content being rendered, applying a machine learning algorithm to at least the second portion of the query fingerprint to detect that the video content being rendered continues to be the identified video content. And still further, the operations could include, responsive to at least detecting that the video content being rendered continues to be the identified video content, causing a user device to render supplemental content.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
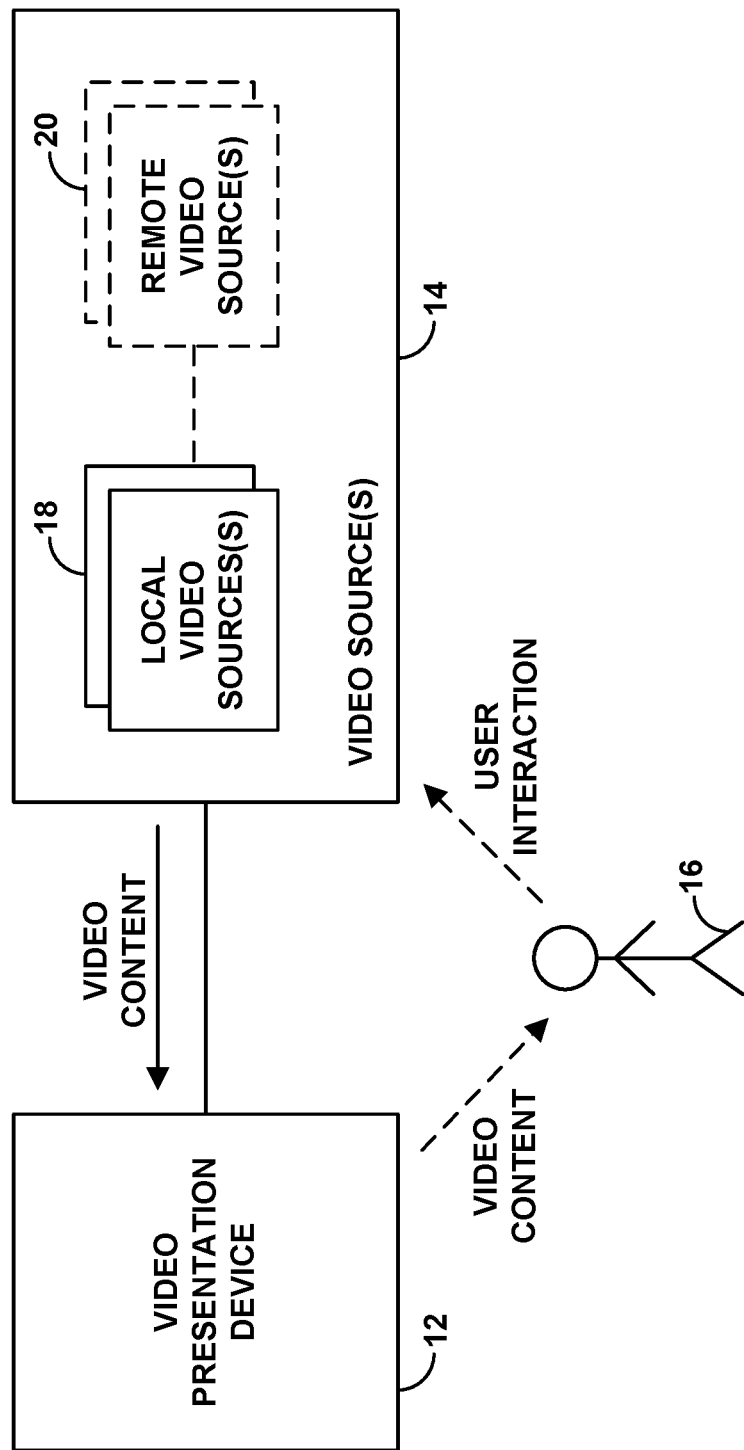
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes a video presentation device 12 communicatively linked with one or more video sources 14 and configured to receive video content from the video source(s) and to render the video content for viewing by a user 16.

In a representative implementation, the video presentation device 12 could be a computer monitor, television, or other device configured to receive and render video content on a display or the like. As such, the video presentation device 12 could include one or more video input ports (e.g., HDMI, DVI, component video, composite video, VGA, and/or other wired or wireless input ports) for receiving video content, a display panel (e.g., an OLED, LED, LCD, plasma, and/or other panel) for presenting the video content, and one or more processing components (e.g., video processors) for rendering the video content as it arrives via a selected video input port and for outputting the rendered video content on the display for presentation to the user 16.

The video sources 14 could then include any of a variety of video components configured to provide video content suitable for receipt and rendering by the video presentation device 12 and to receive and respond to input from user 16 for controlling video-content output, such as for interactively defining the video content. As shown, the video sources could include one or more local video source components 18 and one or more remote video source components 20, any of which could be configured to generate and output, or to receive and forward, the video content for rendering by video presentation device 12. Further, at least one local video source component 18 could be situated in proximity to the user 16 or otherwise in communication with the user 16 and equipped to receive user input for controlling video content output.

By way of example, the video sources 14 could include a video game console connected locally by an HDMI cable or other wired or wireless mechanism with the video presentation device 12. Such a console could be a specialized computer designed to facilitate interactive video gameplay by executing game software from DVDs, CDs, internal storage, network sources, or the like. As such, the console could receive user input selecting, providing, or otherwise designating a video game to play And as the console then executes the game and delivers associated video content to the video presentation device for rendering, the console could receive user input dynamically controlling how the game proceeds and thus dynamically defining the video content being delivered.

Alternatively, the video sources 14 could include a general purpose computer (e.g., a desktop or portable computer) connected locally with the video presentation device and could include a remote game server in network communication with the local computer. In this arrangement, the local computer could provide a user interface, perhaps a generic browser interface, through which the user could interact with the game server, and the local computer could be configured to receive video content from the game server and to deliver the video content to the video presentation device for rendering. Through the user interface of the local computer, the user could thus select or otherwise designate a video game to play and could control how the game proceeds and thus what video content the game server delivers for rendering by the video presentation device.

Still alternatively, the video sources 14 could take other forms, not necessarily limited to video game sources. For instance, the video sources could include a television tuner, such as a cable-TV or satellite set top box, connected locally with the video presentation device and configured to receive user selection of a television channel and to responsively tune to that channel and deliver video content of the television channel to the video presentation device for rendering. And the video sources could include digital video recorders/players, which could similarly receive user selection of video content to play and could responsively deliver the selected video content to the video presentation device for rendering Moreover, the video sources could include an audio/video receiver or other such device that enables user selection of a video source to provide video content and that receives and forwards video from the selected source to the video presentation device for rendering. Other examples are possible as well.

As noted above, as the video presentation device receives and renders video content, the video presentation device may have no indication of the identity of that video content. Rather, the video presentation device may be configured simply to passively receive the video content as a video stream from a video source and to render the received video content. Per the present disclosure, however, the video presentation device may be in communication with a network platform and may work with the network platform to facilitate identification of the video content being rendered and thus to facilitate useful content-specific action as noted above. (Alternatively, features of the network platform could be provided as part of the video presentation device or locally in association with the video presentation device.)

Figure 2:
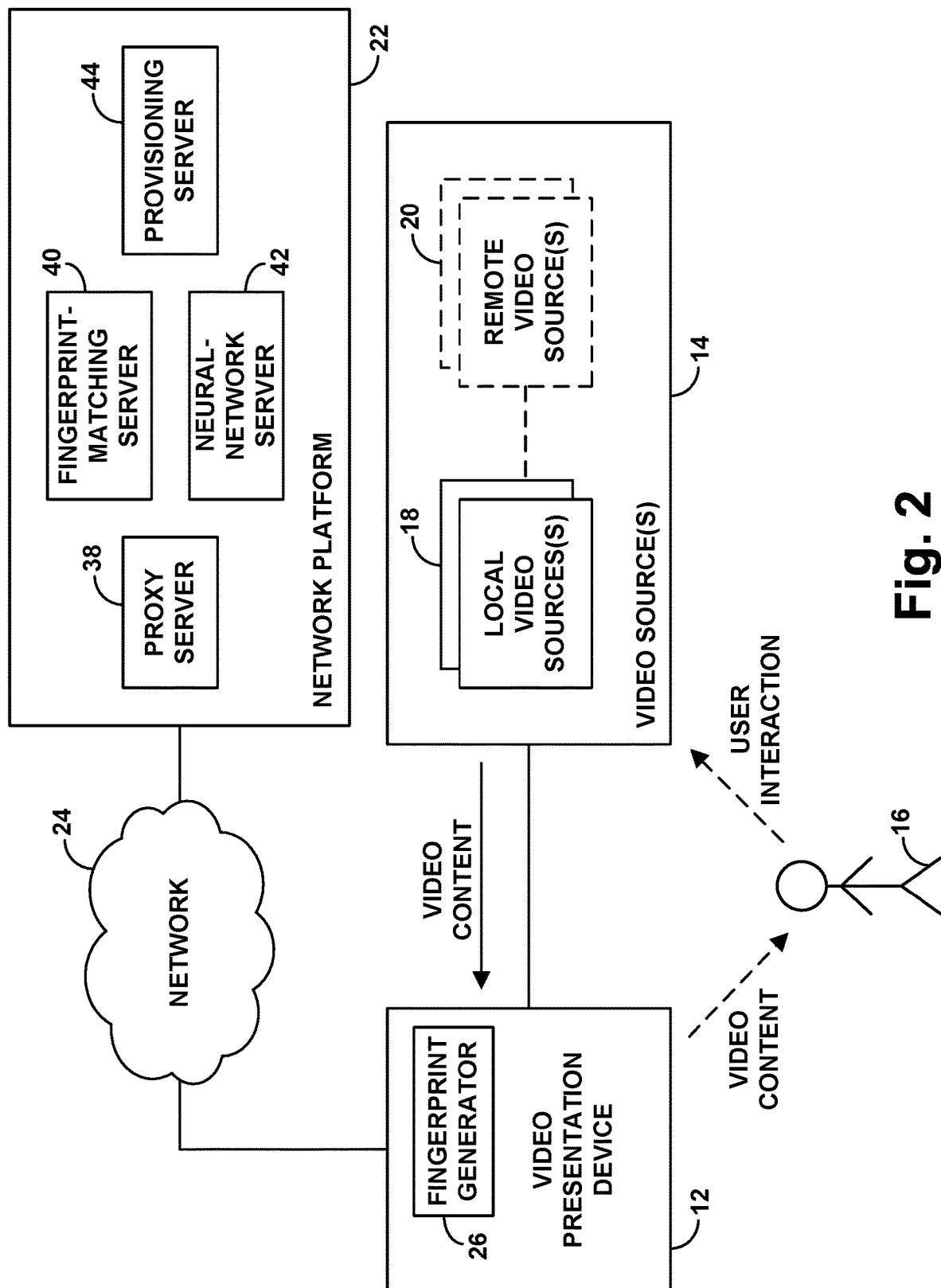
FIG. 2 is a simplified block diagram of an example network arrangement in which a video presentation device communicates with a network platform to facilitate implementing various disclosed principles.

FIG. 2 illustrates an example network arrangement in which the video presentation device 12 is in communication with a network platform 22 via a network 24, such as the Internet. In practice, the video presentation device 12 may sit as a node on a local area network (LAN) at customer premises, with the video presentation device having an assigned Internet Protocol (IP) address on the LAN and the LAN having an IP address on the Internet. Further, the network platform 22 may comprise a server that is also be accessible at an IP address on the Internet.

With this arrangement, the video presentation device may initiate and engage in IP communication with the platform via the Internet to provide the platform with a digital fingerprint of video content in real-time as the video content is being rendered, and the platform may continually evaluate the digital fingerprint as it arrives, in order to identify the video content and to responsively trigger content-specific action.

To facilitate this in practice, the video presentation device 12 or another entity could be configured to generate a digital fingerprint of the video content that is being rendered by the video presentation device and to transmit the digital fingerprint to the platform 22 for analysis.

For instance, as shown in FIG. 2, the video presentation device could include a fingerprint generator 26, which could be configured to generate a digital fingerprint of the video content that is being rendered by the video presentation device. Such a fingerprint generator could be configured to generate the digital fingerprint of video content as the video presentation device is receiving the video content and/or as the video presentation device is processing the video content for presentation. As such, the fingerprint generator could receive as input a copy of the video content arriving at the video presentation device and/or being processed for presentation by the video presentation device, and to apply any media fingerprinting process now known or later developed to generate a digital fingerprint of the video content.

Without limitation, an example digital fingerprinting process could apply on a per video frame basis and could involve establishing a representation of luminosity and/or other video characteristics. For instance, for a given video frame, the fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

In practice, the video presentation device 12 could be configured to programmatically establish a communication session (e.g., a TCP socket) with the platform 22 and to transmit to the platform in that session the digital fingerprint of the video content being rendered (referred to herein as a "query fingerprint"). For instance, the video presentation device could be configured to periodically or from time to time transmit to the platform a message carrying the digital fingerprint of a latest frame, series of frames, or other portion of the video content being rendered by the video presentation device. And the platform could thereby receive the digital fingerprint for analysis, largely in real-time as the video content is being rendered by the video presentation device.

Alternatively, the video presentation device could transmit to the platform, and the platform could thus receive, various data regarding the video content being rendered by the video presentation device, on an ongoing basis or other basis, to enable the platform itself or another entity to generate a query fingerprint of the video content being rendered by the video presentation device. For example, the video presentation device could transmit to the platform portions of the video content being rendered by the video presentation device, such as individual frames (e.g., snapshots) or other segments of the video content. And the platform could apply a fingerprint generator to generate a digital fingerprint of the video content for analysis.

In line with the discussion above, the platform in this arrangement could evaluate the query fingerprint of the video content being rendered by the video presentation device, so as to identify the video content that is being rendered and to responsively take content-specific action.

As explained above, this process could address a scenario where the video content being rendered includes a combination of pre-established video content and interactive video content. For instance, the process could address a scenario where the video content being rendered is a video game that includes (i) one or more pre-established video segments such as cutscenes and the like that do not vary based on user-interaction while being rendered and (ii) one or more dynamically-defined video segments, such as ongoing game-play video content, that vary based on user-interaction while being rendered.

Figure 3:
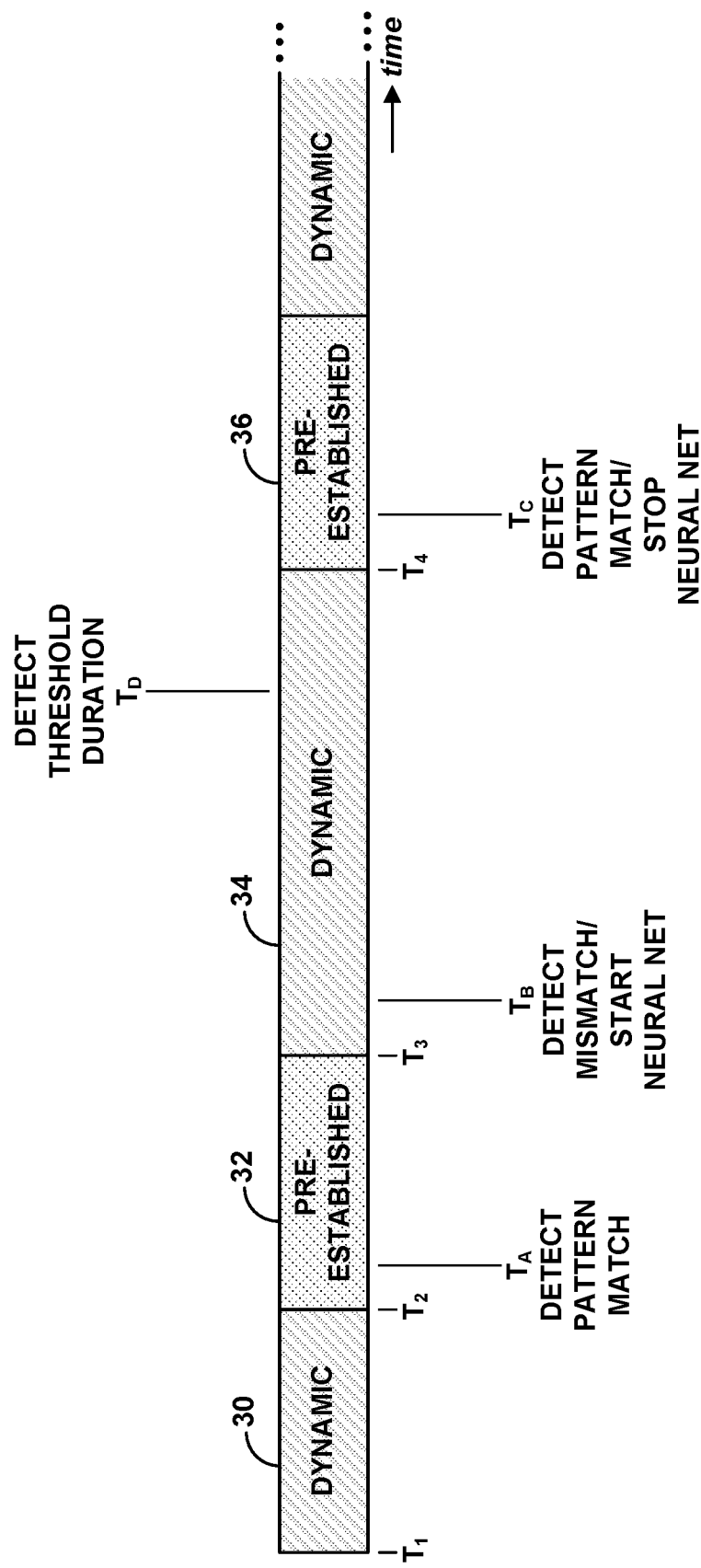
FIG. 3 is a timing diagram illustrating an example of video content including one or more dynamically-defined portions and one or more pre-established portions.

FIG. 3 is a timing diagram illustrating an example of how such video content could be structured. As shown in FIG. 3, the video content includes alternating dynamically defined and pre-established video segments. In particular, the video content includes a first dynamically-defined video segment 30 from time $T_1$ to time $T_2$, a first pre-established video segment 32 from time $T_2$ to time $T_3$, a second dynamically-defined video segment 34 from time $T_2$ to time $T_3$, and a second pre-established video segment 36 from time $T_3$ to time $T_4$.

If this example video content is of a particular video game, for instance, the first and second dynamically-defined video segments 30, 34 could be interactive video content of respective levels of game play, where the video content is defined dynamically based on user interaction while playing (e.g., based on choices the user makes during game play). And the first and second pre-established video segments 32, 36 could be statically defined cinematic cutscenes that are specific to the video game and are presented to the user as the user transitions between levels of game play, or could be other pre-established video segments specific to the video game.

In line with the discussion above, the network platform 22 could be configured to apply a fingerprint matching process in order to identify the video content being rendered, by detecting that the fingerprint of the video content being rendered matches a reference fingerprint of a pre-established video segment that is known to correspond with a particular video content item (e.g., a particular video game). Further, the platform could be configured to apply a trained neural network in order to determine that the video content being rendered continues to be the identified video content, as a basis to trigger associated action.

In an example implementation, the platform could include separate but interworking servers or other modules as shown in FIG. 2. Namely, the platform could include a proxy server 38 having an outwardly facing IP address for communicating with the video presentation device, a fingerprint-matching server 40 for conducting the fingerprint-matching process to identify the video content being rendered, and a neural-network server 42 for applying a trained neural network to determine that the video content being rendered continues to be the identified video content, to facilitate triggering action based on the continued presentation of that video content. These servers could sit as notes on a LAN or could otherwise be communicatively linked together.

With this arrangement, the proxy server 38 could receive from the video presentation device the query fingerprint of the video content being rendered by the video presentation device and, as the query fingerprint arrives, could forward the query fingerprint to the fingerprint-matching server 40 for analysis.

As the fingerprint-matching server 40 receives the query fingerprint, the fingerprint-matching server could then continually (e.g., with quick periodicity) compare the query fingerprint with reference fingerprints of pre-established video segments each known to appear in a respective video content item, in search of a fingerprint match. And upon detecting such a match, the fingerprint-matching server 40 could conclude that the video content being rendered includes the pre-established video segment whose fingerprint matched, and could therefore identify the video content being rendered as being the video content item that is known to include that pre-established video segment. For instance, by detecting a fingerprint match as to a cutscene known to appear in a particular video game, the fingerprint-matching server could conclude that the video content being rendered is that particular video game.

To compare the query fingerprint stream with a reference fingerprint, the server could compare corresponding portions of the fingerprints with each other to determine whether the portions match exactly or within defined tolerances. For example, on a per frame basis or at another desired rate, the server could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Once the fingerprint-matching server detects the start of a fingerprint match as to a pre-established video segment and thus identifies the video content being rendered, the fingerprint-matching server could signal to the proxy server 38 to indicate the determined identity of the video content (e.g., the name of the video game being rendered), perhaps along with a unique identifier of the detected pre-established video segment (e.g., a cutscene identifier). Further, the fingerprint-matching server could then continue to compare the incoming query fingerprint with the reference fingerprint data to determine when the detected fingerprint-match as to that pre-established video segment ends, and then to search for a fingerprint match as to a next pre-established video segment, and so forth.

When the fingerprint-matching server determines from its fingerprint analysis that a detected fingerprint match has ended, that could signify that the video presentation device has finished rendering the associated pre-established video segment. At issue at that point may then be whether the video presentation device continues to render the identified video content and perhaps for how long. For instance, if the identified video content is a particular video game and the fingerprint-matching server detects an end of a fingerprint match as to a cutscene of that video game, at issue may then be whether the video presentation device continues to render the identified video game (as opposed to rendering some other video content) and perhaps how long the rendering of the identified video game continues before the occurrence of a next cutscene.

As explained above, this issue could be difficult to resolve where the continued video content is not another pre-established video segment but is rather a dynamically-defined video segment such as interactive user game play, which may vary greatly depending on user interaction.

To address this issue, the fingerprint-matching server could signal to the proxy server to indicate that the fingerprint-matching server has detected the end of a cutscene, and the proxy server could then responsively invoke the assistance of neural-network server 42. Namely, as the proxy server continues to receive the query fingerprint of the video content being rendered by the video presentation device, the proxy server could forward that query fingerprint to the neural-network server and could direct the neural-network server to begin classifying the query fingerprint in a manner that helps indicate whether the video content being rendered by the video presentation device continues to be the identified video content.

In response to this signal from the proxy server, the neural network server could feed the arriving query fingerprint through a neural network that has been trained to classify digital fingerprints with a desired level of granularity. (Alternatively, the neural network server could regularly receive the arriving query fingerprint from the proxy server and could apply this analysis in parallel with the fingerprint-matching server's analysis, to help identify the video content being rendered.)

By way of example, if the identified video content is a particular video game, the neural-network server could apply a neural network that is trained to distinguish between video game content and non-video-game content. For instance, the neural network could be trained based on input data that includes (i) many digital fingerprints of dynamically-defined video game content and (ii) many digital fingerprints of television content or other non-video-game content. Through this training, the neural network could learn video content characteristics that are indicative of video game content and video content characteristics that are indicative of non-video-game content, and the neural network could thus learn to distinguish video game content from non-video-game content.

Applying such a trained neural network to the query fingerprint representing the video content being rendered by the video presentation device, the neural-network server could thus determine whether the video content being rendered by the video presentation device continues to be video game content or not and could signal to the proxy server accordingly.

If the neural network thereby determines that the video content being rendered by the video presentation device is a video game, then a reasonable conclusion given the identification of the video content as being a particular video game is that the video game being rendered by the video presentation device continues to be that identified video game. Therefore, a reasonable conclusion at this point is that the user is continuing to play the identified video game. Whereas, if and when the neural network determines that the video content being rendered by the video presentation device is not a video game, then a reasonable conclusion is that the video content being rendered by the video presentation device is no longer the identified video game, and therefore that the user has stopped playing the identified video game.

Alternatively or additionally, the neural-network server could apply a neural network that is trained to distinguish more granularly between particular video games and/or between other sorts of interactive video content. For instance, the neural network could be trained based on input data that includes, separately and respectively for each of various particular video games, many digital fingerprints of dynamically defined video game content from instances of playing the particular video game. Through that training, the neural network could learn video content characteristics that are specific to particular video games, and the neural network could thus learn to distinguish one video game from another.

In that case, based on a neural network analysis of the query fingerprint representing the video content being rendered by the video presentation device, the neural-network server could determine whether the video content being rendered by the video presentation device continues to be the particular identified video game, as compared with another video game or other interactive video content for instance. And the neural-network server could accordingly signal to the proxy server, to indicate whether the video content being rendered by the video presentation device continues to be the identified video content.

With this more granular neural-network implementation, each of various video content items (e.g., particular video games) could be designated by a name or other identifier, and the neural network could reference that identifier in its classification. Once the proxy server learns from the fingerprint-matching server the identity of the video content being rendered by the video presentation device, the proxy server could then inform the neural-network server of the video content identifier, and the neural-network server could responsively apply its neural network to determine whether the video content with that identifier is the video content that continues to be rendered by the video presentation device, and could report back to the proxy server accordingly.

The neural network applied by the neural-network server in this process could take any of a variety of forms. By way of example, the neural network could be a recurrent deep neural network that uses a Long Short-Term Memory (LSTM) architecture, the operation of which is described in Hochreiter et al., "Long Short-Term Memory," Neural Computation 9(8): 1735-1780, 1997, http://deeplearning.cs.cmu.edu/pdfs/Hochreiter97_lstm.pdf. Alternatively, other forms of neural networks (e.g., gated recurrent unit neural networks, convolutional neural networks, and others now known or later developed) could be applied as well.

FIG. 3 illustrates how this process could play out with an incoming digital fingerprint representing example video segments 30-36. Here, the network platform 22 would receive a query fingerprint that represents the video content being rendered, and thus the query fingerprint could include, in order, a first portion representing dynamically-defined video segment 30, a second portion representing pre-established video segment 32, a third portion representing dynamically-defined video segment 34, and a fourth portion representing pre-established video segment 36.

In line with the discussion above, as the platform receives this query fingerprint, the proxy server could forward the query fingerprint to the fingerprint-matching server, and the fingerprint-matching server could continually compare the query fingerprint with reference fingerprints representing various pre-established video segments corresponding with known video content items. As a result, shortly after time $T_2$ (at time $T_A$), the fingerprint-matching server could detect a match with a reference fingerprint of a pre-established video segment corresponding with a particular known video game, thus supporting a conclusion that the video content being rendered is that particular video game. And the fingerprint-matching server could report this finding to the proxy server.

As the fingerprint-matching server then continues to evaluate the incoming query fingerprint, shortly after time $T_3$ (at time $T_B$), the fingerprint-matching server could then detect a mismatch, resulting from the pre-established video segment ending, and could report this to the proxy server. In response to this mismatch and thus to the ending of the pre-established video segment, the proxy server could then begin forwarding the incoming digital fingerprint to the neural-network server (if the proxy server was not doing so already) and could signal to the neural-network server the determined identity of the video-content at issue.

In response, the neural-network server could then apply a trained neural network to the query fingerprint as the query fingerprint arrives, in an effort to classify the query fingerprint and thus to determine whether the query fingerprint continues to represent the identified video content. For instance, if the identified video content is a particular video game, then the neural-network server could continually apply a neural network to the arriving query fingerprint to determine whether the query fingerprint continues to represent video-game content generally and/or to determine whether the fingerprint continues to represent the specifically identified video game. And the neural-network server could report its findings to the proxy server, also perhaps continually.

Meanwhile, as the fingerprint-matching server continues to compare the incoming query fingerprint with reference fingerprints, shortly after time $T_4$ (at time $T_C$), the fingerprint-matching server could detect a match with a reference fingerprint of another pre-established video segment that also corresponds with the identified video game and could report that finding to the proxy server. As this match with a pre-established video segment indicates an end of the dynamically-defined video segment 34, the proxy server could then discontinue forwarding the digital fingerprint to the neural-network server and could signal to the neural-network server to stop application of the neural-network.

This process could then continue iteratively, with the fingerprint-matching server again detecting an end of the match with the fingerprint of the detected pre-established video segment and responsively signaling to the proxy server, the proxy server responsively signaling to the neural-network server, and the neural network server responsively applying a neural network to determine whether the video content being rendered by the video presentation device continues to be the identified video content.

As noted above, this process assumes that the fingerprint-matching server has access to reference fingerprints of various pre-established video segments each corresponding with known video content items, and that the neural-network server is configured with a neural network that is trained based on various known video content items. To facilitate this process in practice, the network platform 22 could further includes a provisioning server 44 that could interwork with the fingerprint-matching server 40 and neural-network server 42 to help establish the reference fingerprints and train the neural network.

As to video games, the provisioning server could obtain numerous video recordings of actual instances of video-game play and could generate digital fingerprints of those video recordings for use to generate the reference fingerprints of pre-established video segments (e.g., cutscenes and the like) and for use to train one or more neural networks.

The provisioning server could obtain these recordings of actual instances of video-game play in various ways. One useful source of the recordings, for instance, is online "Let's Play" (LP) videos and other play-through videos, commonly accessible on websites such as Twitch and YouTube. These play-through videos are recordings of actual instances of game play, sometimes edited with scripted narration, and sometimes being more raw recordings of game play captured on the fly.

In an example implementation, the provisioning server could be configured to automatically search for and generate digital fingerprints of these play-through videos. By way of example, an administrator of the network platform could enter into the provisioning server names of various known video games, and the provisioning server could automatically search websites such as Twitch and YouTube for play-through videos of the named video games. As the provisioning server finds such videos, the provisioning server could then automatically play the videos (e.g., receive streaming video representations of the videos) and, applying a fingerprint generator such as that noted above, generate corresponding digital fingerprints of the videos. The provisioning server could then save the resulting digital fingerprints in correlation with the names of the video games.

Provided with these digital fingerprints of actual instances of game play, the provisioning server could then programmatically evaluate the digital fingerprints to identify fingerprint segments that represent pre-established video segments. For instance, by evaluating fingerprints of multiple instances of play of a particular video game, the provisioning server could identify a fingerprint segment that repeatedly occurs within each instance of play of that video game or that occurs at least once in each instance of play of that video game. Given the static nature of pre-established video segments such as cutscenes, the provisioning server could thus deem such recurring fingerprint segments to represent pre-established video segments of the video game. The provisioning server could therefore store those fingerprint segments as reference fingerprints representing pre-established video segments in correlation with the known identity of the video game at issue, and perhaps with an identifier of the pre-established video segment. And the provisioning server could make that reference fingerprint data available to the fingerprint-matching server for use to identify video content being rendered by a video presentation device as discussed above.

Alternatively, the provisioning server could obtain reference fingerprints of pre-established video segments correlated with known video content items in other ways. For instance, a person could watch video recordings of various video games and could manually identify the pre-established video segments (e.g., by their start and stop times) and direct the provisioning server to generate reference fingerprints of those identified video segments. Other examples are possible as well.

Further, the provisioning server could provide the digital fingerprints of the actual instances of video game play to the neural-network server for use by the neural-network server to train one or more neural-networks. The provisioning server could provide the neural-network server with the full digital fingerprints of each such recording, along with the video game identity of each recording. Or the provisioning server could separate out the fingerprint segments that represent the dynamically-defined segments of the recordings, based on those fingerprint segments not being the segments that were deemed to represent pre-established video segments, and the provisioning server could provide those fingerprint segments to the neural-network server along with the video game identity of each recording.

In addition, to enable the neural-network server to train a neural network to distinguish between video-game content and non-video-game content, the provisioning server could also obtain digital fingerprints of non-video-game content, such as television content. For instance, the provisioning server and/or other associated servers could include one or more television watching stations having tuners for receiving various channels of television content, and could use a fingerprint generator like that described above to generate digital fingerprints of that television content. The provisioning server could then provide these digital fingerprints of non-video-game content to the neural-network server for use to train one or more neural networks as described above.

In accordance with the present disclosure, as noted above, the network platform could be configured to take actions in response to determining the identity of the video content being rendered by the video presentation device, and perhaps specifically in response to detecting a threshold duration of the video presentation device continuing to render an identified video content item.

By way of example, once the proxy server learns the identity of the video content being rendered by the video presentation device (e.g., the identity of a particular video game being rendered by the video presentation device), the proxy server or an associated entity could record ratings-data regarding presentation of that video content. For instance, the proxy server could record the fact that the video presentation device is presenting the identified video content, such as by adding to a count or other statistic of the identified video content being presented, as data to indicate the extent to which that video content gets presented. Further, the proxy server could record such data per video presentation device (as device-specific viewing analytics) and associated demographics.

As another example, once the proxy server learns the identity of the video content being rendered by the video presentation device, the proxy server or an associated entity could cause the video presentation device or another user device to present supplemental content, perhaps content associated with the identified video content. For instance, the proxy server could cause the video presentation device or another user device to present a pop-up advertisement offering virtual content or physical merchandise that could be of interest given that the identified video content (e.g., additional game levels or other game content), or offering help or other information of possible interest. In particular, the proxy server could send to the video presentation device or other user device a message carrying such supplemental content with a directive to which the video presentation device or other user device will respond by superimposing the supplemental content over the presented video content (e.g., at a corner or edge of the display) for viewing by a user or otherwise presenting the supplemental content to a user.

As a specific example of this, as noted above, the proxy server could determine how long the video presentation device continues to render the identified video content between instances of pre-established video segments of the video content and could take action based on that determined duration. For instance, the proxy server could determine how long an interactive video segment of an identified video game continues between cutscenes of that video game, possibly indicating how long a user has been trying to reach a next level of game play, and could take action based on that duration. If the determined duration is threshold long (and still ongoing), as shown in FIG. 3 at time $T_D$ for instance, then the proxy server could responsively cause the video presentation device to present the user with help content, such as game-play hints, on grounds that the user appears to be struggling. Whereas, if the determined duration is threshold short, then the proxy server could responsively cause the video presentation device to present the user with offers to purchase of higher game levels or the like, on grounds that the user appears to be an expert player.

This evaluation of duration between pre-established video segments could be specific to the identified video content, with one or more duration thresholds established based on an historical statistical analysis of actual instances of playing the identified video content. In practice, the provisioning server or another entity could develop such thresholds. For example, as to a particular video game, the provisioning server could evaluate the duration between particular cutscenes in that video game, in each of many instances of play of that video game (e.g., play-through recordings or the like) and could average those durations or otherwise roll up the duration data to establish what might be deemed a typical duration between the cutscenes. And the provisioning server could provide the proxy server with data indicating those durations (along with identifiers of the cutscenes), for use as thresholds to determine whether the duration between those cutscenes in a given instance of play of the video game is threshold long or threshold short. Other implementations are possible as well.

Figure 4:
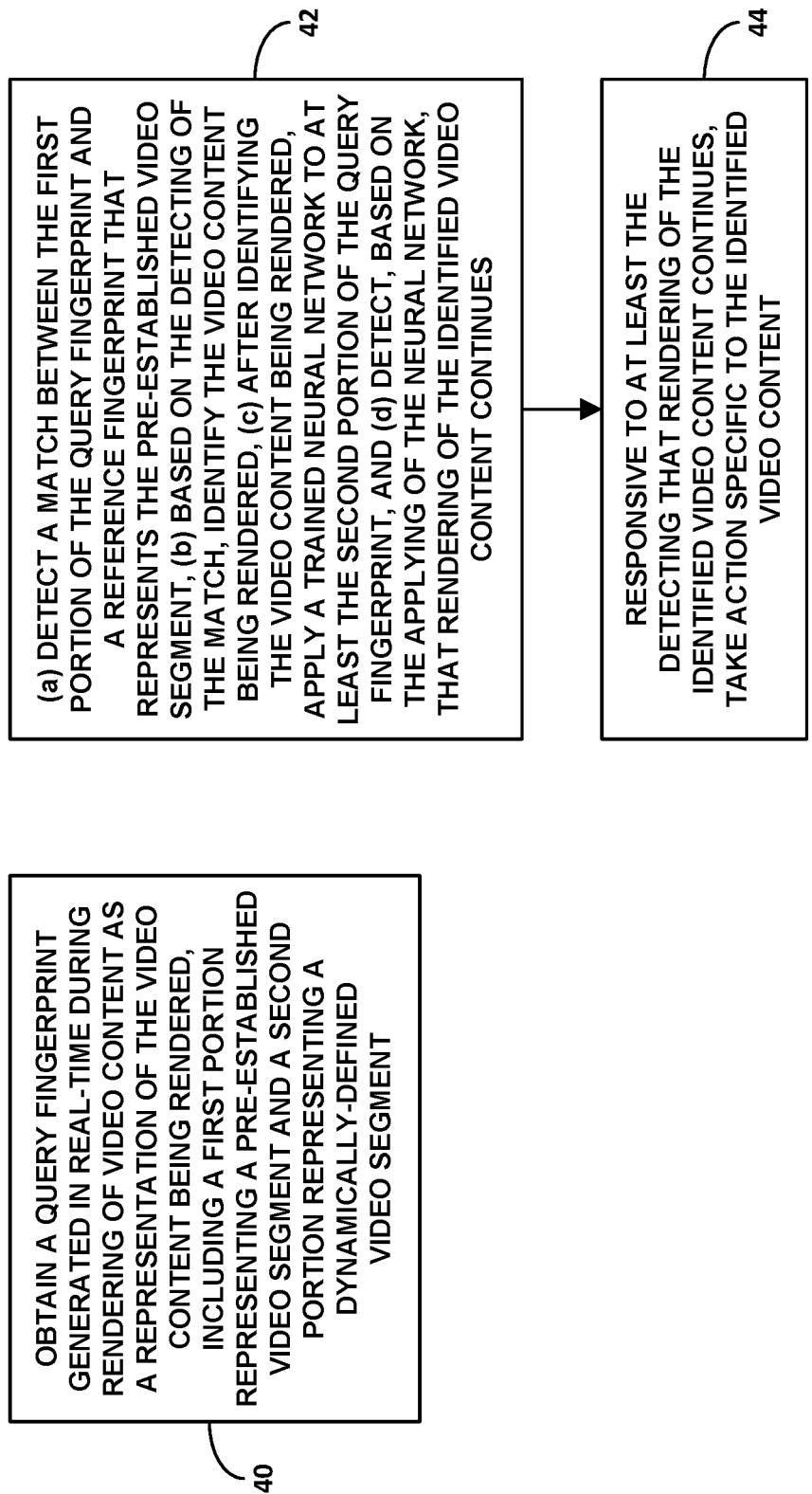
FIG. 4 is a diagram depicting operations that can be carried out in accordance with the present disclosure.

FIG. 4 is next a diagram of an example method in line with the discussion above, to detect and respond to rendering of video content by a video presentation device, where the video content includes (i) a pre-established video segment that does not vary based on user-interaction during the rendering and (ii) a dynamically-defined video segment that varies based on user-interaction during the rendering.

As shown in FIG. 4, at block 40, the method includes a computing system obtaining (e.g., receiving or establishing) a query fingerprint generated in real-time during the rendering as a representation of the video content being rendered, where the query fingerprint includes a first portion representing the pre-established video segment and a second portion representing the dynamically-defined video segment. Further, at block 42, shown concurrent with block 40, the computing system detects a match between the first portion of the query fingerprint and a reference fingerprint that represents the pre-established video segment, (b) based on the detecting of the match, identifies the video content being rendered, (c) after identifying the video content being rendered, applies a trained neural network to at least the second portion of the query fingerprint, and (d) detects, based on the applying of the neural network, that rendering of the identified video content continues. In turn, at block 44, responsive to at least the detecting that rendering of the identified video content continues, the computing system takes action specific to the identified video content.

In line with the discussion above, the video content in this method could comprise video game content, and the act of identifying the video content being rendered could comprise determining an identity of a particular video game being rendered. Further, the act of detecting that rendering of the identified video content continues could comprise detecting that the video content being rendered by the video presentation device continues to be video game content and/or detecting that the video content being rendered continued to be the particular identified video game. And still further, the act of taking action specific to the identified video content could comprise causing presentation of supplemental content comprising an offer for additional video game content.

As further discussed above, the method could additionally include the computing system detecting an ending of the detected match (as to the pre-established video segment), in which case the act of applying the trained neural network could be responsive to at least the detecting of the ending of the detected match.

In addition, the method could include the computing system determining, based on the applying of the trained neural network to at least the second portion of the query fingerprint, that rendering of the dynamically-defined portion of the video content has continued for at least a threshold duration. And the act of taking action specific to the identified video content could comprise causing a presentation of supplemental content. Moreover, the act of presenting supplemental content could be further responsive to the act of determining that rendering of the dynamically-defined portion of the video content has continued for at least the threshold duration. For instance, the dynamically-defined portion of the video content could comprise interactive video game content, and the act of causing presentation of the supplemental content further responsive to the dynamically-defined portion of the video content having continued for at least the threshold duration could involve causing presentation of video-game help content.

Further, the pre-established video segment could be labeled a first pre-established video segment, and the video content could include a second pre-established video segment that also does not vary based on user-interaction during the rendering, with the query fingerprint including a third portion that represents the second pre-established video segment. And in that case, the act of determining, based on the applying of the trained neural network to at least the second portion of the query fingerprint, that rendering of the dynamically-defined portion of the video content has continued for at least the threshold duration could comprise detecting a threshold long duration from rendering the first pre-established video segment until (e.g., before or as of) rendering the second pre-established video segment.

Moreover, the match could be labeled a first match, and the method could additionally include the computing system detecting a second match between the third portion of the query fingerprint and a reference fingerprint that represents the second pre-established video segment and, based on the detecting of the second match, discontinuing the applying of the trained neural network to the query fingerprint.

In addition, in line with the discussion above, the computing system could communicate with the video presentation device via a network, and the act of the computing system obtaining the query fingerprint generated in real-time during the rendering as a representation of the video content being rendered could comprise the computing system receiving from the video presentation device, via the network, transmissions (e.g., a continual transmission or sequential transmissions) of the query fingerprint generated in real-time by the video presentation device during the rendering of the video content.

Further, as discussed above, the method could additionally include establishing a set of reference data, including the reference fingerprint and the trained neural network, based on computerized analysis of various instances of video game play. For instance, the method could involve automatically searching for and downloading (e.g., receiving streaming playout) from a public packet-switched network at least some of the various instances of video game play, such as play-through videos, and conducting the computerized analysis on the downloaded (e.g., streaming) instances of video game play.

Figure 5:
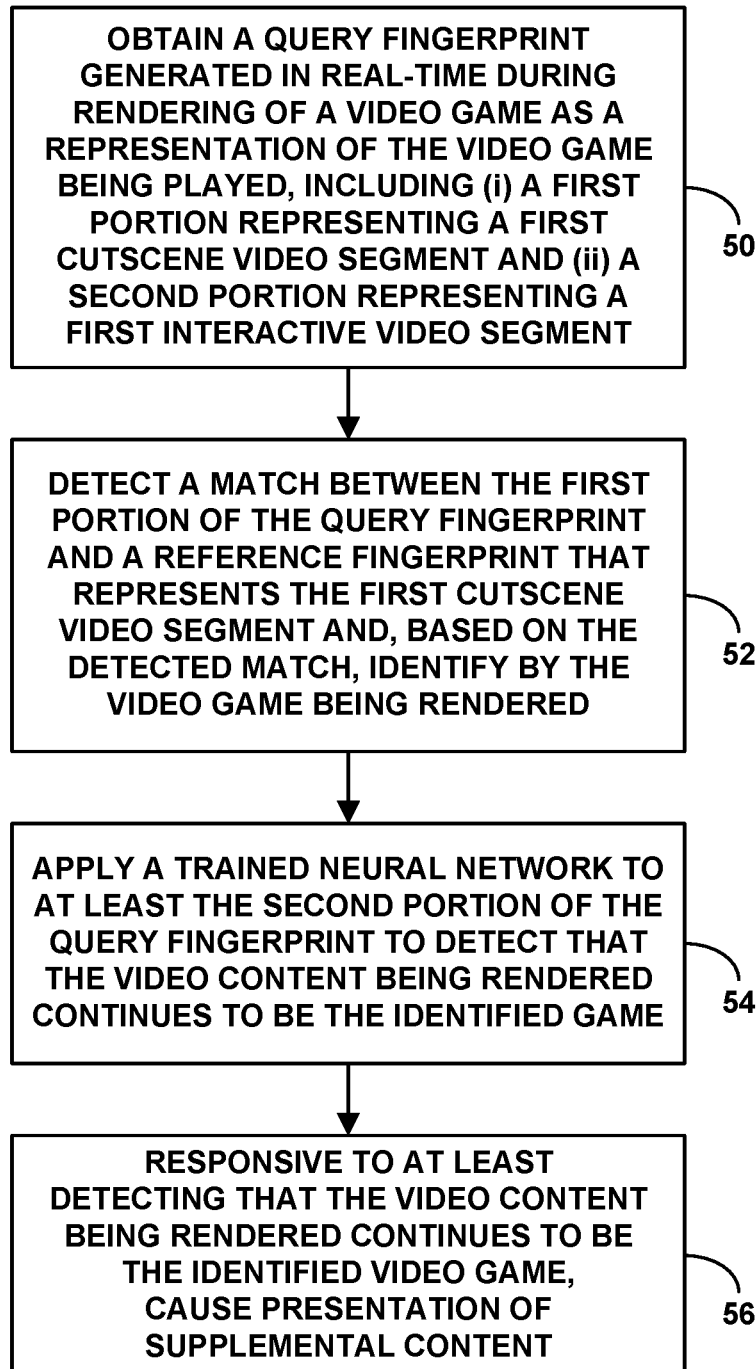
FIG. 5 is another diagram depicting operations that can be carried out in accordance with the present disclosure.

FIG. 5 is next another diagram depicting a method in line with the discussion above, for detecting and responding to playing of a video game, where the video game is rendered in real-time on a video display unit (e.g., a video presentation device or associated unit), and where the video game includes (i) cutscene video segments that do not vary based on user-interaction during the rendering and (ii) interactive video segments that vary based on user-interaction during the rendering.

As shown in FIG. 5, at block 50, the method includes a computing system obtaining a query fingerprint generated in real-time during the rendering as a representation of the video game being played, wherein the query fingerprint includes (i) a first portion representing a first cutscene video segment and (ii) a second portion representing a first interactive video segment. And the method includes subsequent blocks that could be carried out while so obtaining the query fingerprint. In particular, at block 52, the method includes the computing system detecting a match between the first portion of the query fingerprint and a reference fingerprint that represents the first cutscene video segment and, based on the detected match, identifying by the computing system the video game being rendered. At block 54, the method includes, after so identifying the video content being rendered, the computing system applying a trained neural network to at least the second portion of the query fingerprint to detect that the video content being rendered continues to be the identified game. And at block 56, the method includes, responsive to at least detecting that the video content being rendered continues to be the identified video game, the computing system causing a presentation of supplemental content.

As further discussed above, this method could additionally include the computing system detecting an ending of the detected match, and the applying of the trained neural network could responsive to at least the detecting of the ending of the detected match. Further, the method could additionally include the computing system determining, based on the applying of the trained neural network to at least the second portion of the query fingerprint, that the first interactive video segment has continued for at least a threshold duration, the presentation of supplemental content could be further responsive to the determining that the interactive portion of the video content has continued for at least the threshold duration, and the supplemental content could comprise video-game help content.

Figure 6:
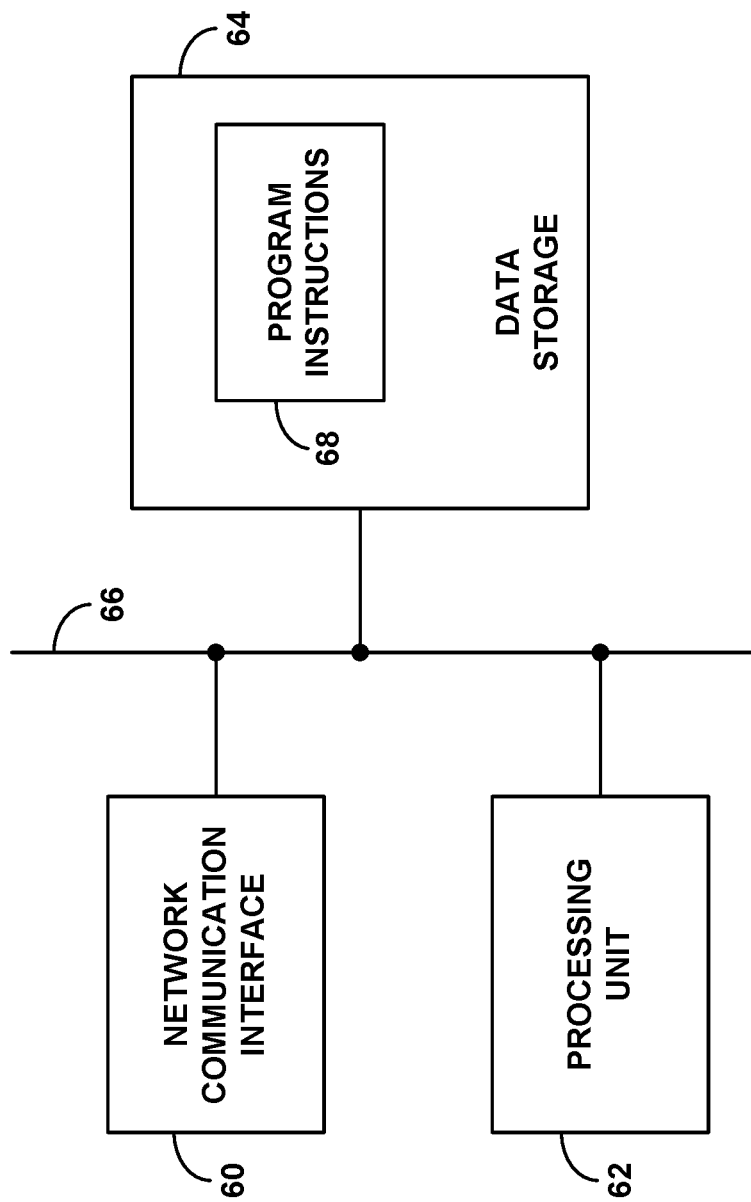
FIG. 6 is a simplified block diagram of an example computing system.

FIG. 6 is next a simplified block diagram of an example computing system operable in accordance with the present disclosure. This computing system could be embodied as the network platform 22 discussed above and/or as one or more other entities (possibly including the video presentation device). As shown in FIG. 6, the example system includes a network communication interface 60, a processing unit 62, non-transitory data storage 64, any or all of which could be integrated together or, as shown, communicatively linked together by a system bus, network, or other connection mechanism 66.

Network communication interface 60 could comprise one or more physical network connection mechanisms to facilitate communication on a network such as network 24 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 62 could then comprise one or more general purpose processors (e.g., microprocessors) and/or one or more specialized processors (e.g., application specific integrated circuits). And non-transitory data storage 64 could comprise one or more volatile and/or non-volatile storage components, such as optical, magnetic, or flash storage.

As shown, data storage 64 then stores program instructions 68, which could be executable by processing unit 62 to carry out various operations described herein, for detecting and responding to rendering of video content by a video presentation device, where the video content includes, in order, (i) a pre-established video segment that does not vary based on user-interaction during the rendering and (ii) a dynamically-defined video segment that varies based on user-interaction during the rendering.

As discussed above, for instance, the operations could then include receiving from the video presentation device, via the network communication interface, a query fingerprint generated in real-time during the rendering as a representation of the video content being rendered, where the query fingerprint includes, in order, (i) a first portion representing the pre-established video segment and (ii) a second portion representing the dynamically-defined video segment. Further, the operations could include detecting a match between the first portion of the query fingerprint and a reference fingerprint that represents the pre-established video segment and, based on the detected match, identifying the video content being rendered. The operations could then include, after identifying the video content being rendered, applying a trained neural network to at least the second portion of the query fingerprint to detect that the video content being rendered continues to be the identified video content, and responsive to at least detecting that the video content being rendered continues to be the identified video content, causing a user device to render supplemental content.

Various features described above could be applied in this context as well. For example, the video content could comprise video game content, the pre-established video segment could comprise a cutscene video segment, and the dynamically-defined video segment could comprise an interactive gameplay video segment. And in that case, the operations could additionally comprise determining, based on the applying of the trained neural network to at least the second portion of the query fingerprint, that the interactive gameplay video segment has continued for at least a threshold duration, the causing of the user device to render the supplemental content could be further responsive to the determining that the interactive gameplay video segment has continued for at least the threshold duration, and the supplemental content could comprise video-game help content.

Figure 7:
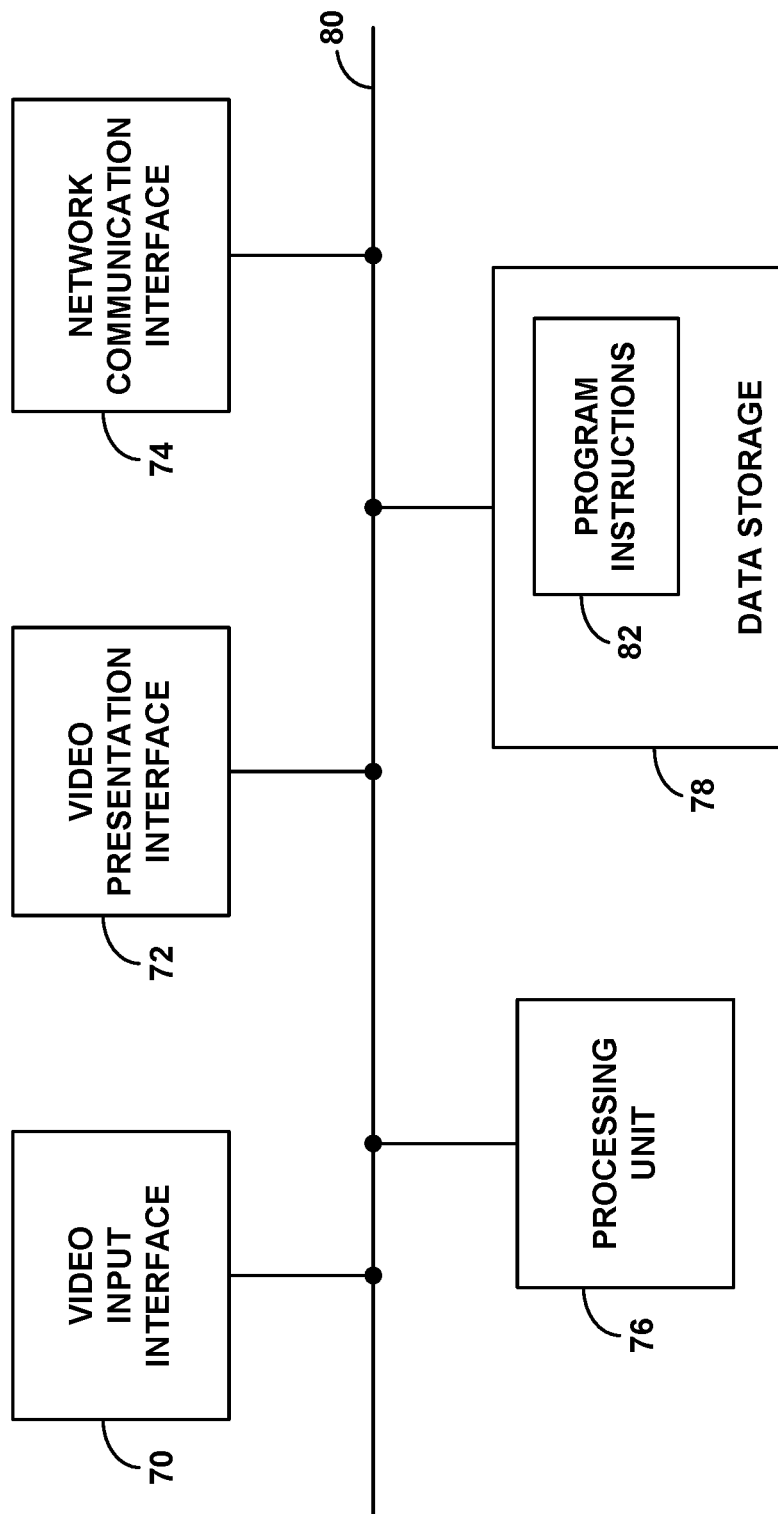
FIG. 7 is a simplified block diagram of an example video presentation device.

Finally, FIG. 7 is a simplified block diagram of an example video presentation device operable in accordance with the present disclosure. In line with the discussion above, this video presentation device could take various forms. For instance, it could be a television, computer monitor, or other device that operates to receive and render video content.

As shown in FIG. 7, the example video presentation device includes a video input interface 70, a video presentation interface 72, a network communication interface 74, a processing unit 76, and non-transitory data storage 78, any or all of which could be integrated together or, as shown, communicatively linked together by a system bus, network, or other connection mechanism 80.

Video input interface 70 could comprise a physical communication interface for receiving video content to be presented by the video presentation device. As such, the media input interface could include one or more wired and/or wireless interfaces for establishing communication with and receiving video content in analog or digital form from a video source. For example, the video input interface could one or more of the interfaces noted above, among other possibilities.

Video presentation interface 72 could then comprise one or more components to facilitate presentation of the received video content. By way of example, the video presentation interface could comprise a display panel as well as one or more video display drivers or other components for processing the received video content to facilitate presentation of the video content on the display panel.

Network communication interface 74 could comprise a physical network connection mechanism to facilitate communication on a network such as network 24 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 76 could then comprise one or more general purpose processors (e.g., microprocessors) and/or one or more specialized processors (e.g., application specific integrated circuits). And non-transitory data storage 78 could comprise one or more volatile and/or non-volatile storage components, such as optical, magnetic, or flash storage. Further, as shown, data storage 78 stores program instructions 82, which could be executable by processing unit 76 to carry out various operations described here. For example, the program instructions could be executable to generate on an ongoing basis a fingerprint of video content being rendered by the video presentation device, based on analysis of the media content being received at the video input interface 70 and/or being processed at the video presentation interface, and to provide the generated fingerprint on an ongoing basis to facilitate channel identification as described herein.

Note that, while the above discussion provides for using a neural network to determine that the video content being rendered by the video presentation device continues to be the identified video content, other sorts of machine learning algorithms could be used for this purpose as well. For example, a template-matching process could be used. Template matching could involve identifying a sequence or other pattern of video frames (possibly non-contiguous) specific a given video content item. A template-matching server could thus apply a training process in which it evaluates reference fingerprints of interactive video content to identify one or more such patterns per video content item. And the template-matching server could then classify an incoming query fingerprint by detecting that the query fingerprint includes a pattern that the training process had associated with a particular video content item. Other machine-learning processes could be used as well.

Exemplary embodiments have been described above. Those skilled in the art will understand, however, that changes and modifications may be made to these embodiments without departing from the true scope and spirit of the invention.

We claim:

1. A method of detecting and responding to rendering of video content by a video presentation device, wherein the video content includes (i) a pre-established video segment that does not vary based on user-interaction during the rendering and (ii) a dynamically-defined video segment that varies based on user-interaction during the rendering, the method comprising:

obtaining by a computing system a query fingerprint generated in real-time during the rendering as a representation of the video content being rendered, the query fingerprint including a first portion representing the pre-established video segment and a second portion representing the dynamically-defined video segment;

while obtaining the query fingerprint, the computing system (a) detecting a match between the first portion of the query fingerprint and a reference fingerprint that represents the pre-established video segment, (b) based on the detecting of the match, identifying the video content being rendered, (c) after identifying the video content being rendered, applying a trained neural network to at least the second portion of the query fingerprint, and (d) detecting, based on the applying of the neural network, that rendering of the identified video content continues; and responsive to at least the detecting that rendering of the identified video content continues, the computing system taking action specific to the identified video content.

2. The method of claim 1, wherein the video content comprises video game content.

3. The method of claim 2, wherein detecting that rendering of the identified video content continues comprises detecting that the video content being rendered by the video presentation device continues to be video game content.

4. The method of claim 2, wherein identifying the video content being rendered comprises determining an identity of a particular video game being rendered, and wherein detecting that rendering of the identified video content continues comprises detecting that the video content being rendered continues to be the particular video game.

5. The method of claim 2, wherein taking action specific to the identified video content comprises causing presentation of supplemental content comprising an offer for additional video game content.

6. The method of claim 1, further comprising:
detecting by the computing system an ending of the detected match,
wherein applying by the computing system the trained neural network is responsive to at least the detecting of the ending of the detected match.

7. The method of claim 1, further comprising:
determining by the computing system, based on the applying of the trained neural network to at least the second portion of the query fingerprint, that rendering of the dynamically-defined segment of the video content has continued for at least a threshold duration,
wherein taking action specific to the identified video content comprises causing a presentation of supplemental content, and
wherein causing the presentation of supplemental content is further responsive to the determining that rendering of the dynamically-defined segment of the video content has continued for at least the threshold duration.

8. The method of claim 7,
wherein the dynamically-defined segment of the video content comprises interactive video game content, and
wherein causing presentation of the supplemental content further responsive to the dynamically-defined segment of the video content having continued for at least the threshold duration comprises causing presentation of video-game help content.

9. The method of claim 7, wherein the pre-established video segment is a first pre-established video segment, wherein the video content includes a second pre-established video segment that also does not vary based on user-interaction during the rendering, and wherein the query fingerprint includes a third portion representing the second pre-established video segment, and wherein determining by the computing system, based on the applying of the trained neural network to at least the second portion of the query fingerprint, that rendering of the dynamically-defined segment of the video content has continued for at least the threshold duration comprises detecting a threshold long duration from rendering the first pre-established video segment until rendering the second pre-established video segment.

10. The method of claim 9, wherein the match is a first match, the method further comprising:
detecting by the computing system a second match between the third portion of the query fingerprint and a reference fingerprint that represents the second pre-established video segment and, based on the detecting of the second match, discontinuing by the computing system the applying of the trained neural network to the query fingerprint.

11. The method of claim 1, wherein the computing system communicates with the video presentation device via a network, wherein obtaining by the computing system the query fingerprint generated in real-time during the rendering as a representation of the video content being rendered comprises receiving by the computing system from the video presentation device, via the network, transmissions of the query fingerprint generated in real-time by the video presentation device during the rendering of the video content.

12. The method of claim 1, further comprising:
establishing a set of reference data, including the reference fingerprint and the trained neural network, based on computerized analysis of various instances of video game play.

13. The method of claim 12, further comprising:
automatically searching for and downloading from a public packet-switched network at least some of the various instances of video game play; and
conducting the computerized analysis on the downloaded various instances of video game play.

14. The method of claim 13, wherein the various instances of video game play comprise play-through videos.

15. The method of claim 1, wherein the neural network comprises a Long Short Term Memory neural network.

16. A method of detecting and responding to playing of a video game, wherein the video game is rendered in real-time on a video display unit, and wherein the video game includes (i) cutscene video segments that do not vary based on user-interaction during the rendering and (ii) interactive video segments that vary based on user-interaction during the rendering, the method comprising:
obtaining by a computing system a query fingerprint generated in real-time during the rendering as a representation of the video game being played, wherein the query fingerprint includes (i) a first portion representing a first cutscene video segment and (ii) a second portion representing a first interactive video segment;
detecting by the computing system a match between the first portion of the query fingerprint and a reference fingerprint that represents the first cutscene video segment and, based on the detected match, identifying by the computing system the video game being rendered;
after identifying by the computing system the video game being rendered, applying by the computing system a trained neural network to at least the second portion of the query fingerprint to detect that the video game being rendered continues to be the identified game; and responsive to at least detecting that the video game being rendered continues to be the identified video game, causing by the computing system a presentation of supplemental content.

17. The method of claim 16, further comprising:

detecting by the computing system an ending of the detected match, wherein applying by the computing system the trained neural network is responsive to at least the detecting of the ending of the detected match.

18. The method of claim 16, further comprising:

determining by the computing system, based on the applying of the trained neural network to at least the second portion of the query fingerprint, that the first interactive video segment has continued for at least a threshold duration, wherein causing the presentation of supplemental content is further responsive to the determining that the first interactive video segment has continued for at least the threshold duration, and wherein the supplemental content comprises video-game help content.

19. A computing system comprising:

a network communication interface;

a processing unit;

non-transitory data storage; and program instructions stored in the non-transitory data storage and executable by the processing unit to carry out operations for detecting and responding to rendering of video content by a video presentation device, wherein the video content includes, in order, (i) a pre-established video segment that does not vary based on user-interaction during the rendering and (ii) a dynamically-defined video segment that varies based on user-interaction during the rendering, and wherein the operations comprise:

receiving from the video presentation device, via the network communication interface, a query fingerprint generated in real-time during the rendering as a representation of the video content being rendered, wherein the query fingerprint includes, in order, (i) a first portion representing the pre-established video segment and (ii) a second portion representing the dynamically-defined video segment, detecting a match between the first portion of the query fingerprint and a reference fingerprint that represents the pre-established video segment and, based on the detected match, identifying the video content being rendered, after identifying the video content being rendered, applying a machine-learning algorithm to at least the second portion of the query fingerprint to detect that the video content being rendered continues to be the identified video content, and responsive to at least detecting that the video content being rendered continues to be the identified video content, causing a user device to render supplemental content.

20. The computing system of claim 19, wherein the video content comprises video game content, wherein the pre-established video segment comprises a cutscene video segment, wherein the dynamically-defined video segment comprises an interactive gameplay video segment, and wherein the operations further comprise:

determining, based on the applying of the machine-learning algorithm to at least the second portion of the query fingerprint, that the interactive gameplay video segment has continued for at least a threshold duration, wherein causing the user device to render the supplemental content is further responsive to the determining that the interactive gameplay video segment has continued for at least the threshold duration, and wherein the supplemental content comprises video-game help content.

* * * * *